No. 619,197. Patented Feb. 7, 1899.
W. MALAM.
APPARATUS FOR MANUFACTURING WHEELS, PULLEYS, &c.
(Application filed Dec. 22, 1897.)
(No Model.) 4 Sheets—Sheet 1.

x x

WITNESSES:
F. W. Wright
S. C. Connor

INVENTOR
WILLIAM MALAM
BY
Horsman and Horsman
HIS ATTORNEYS

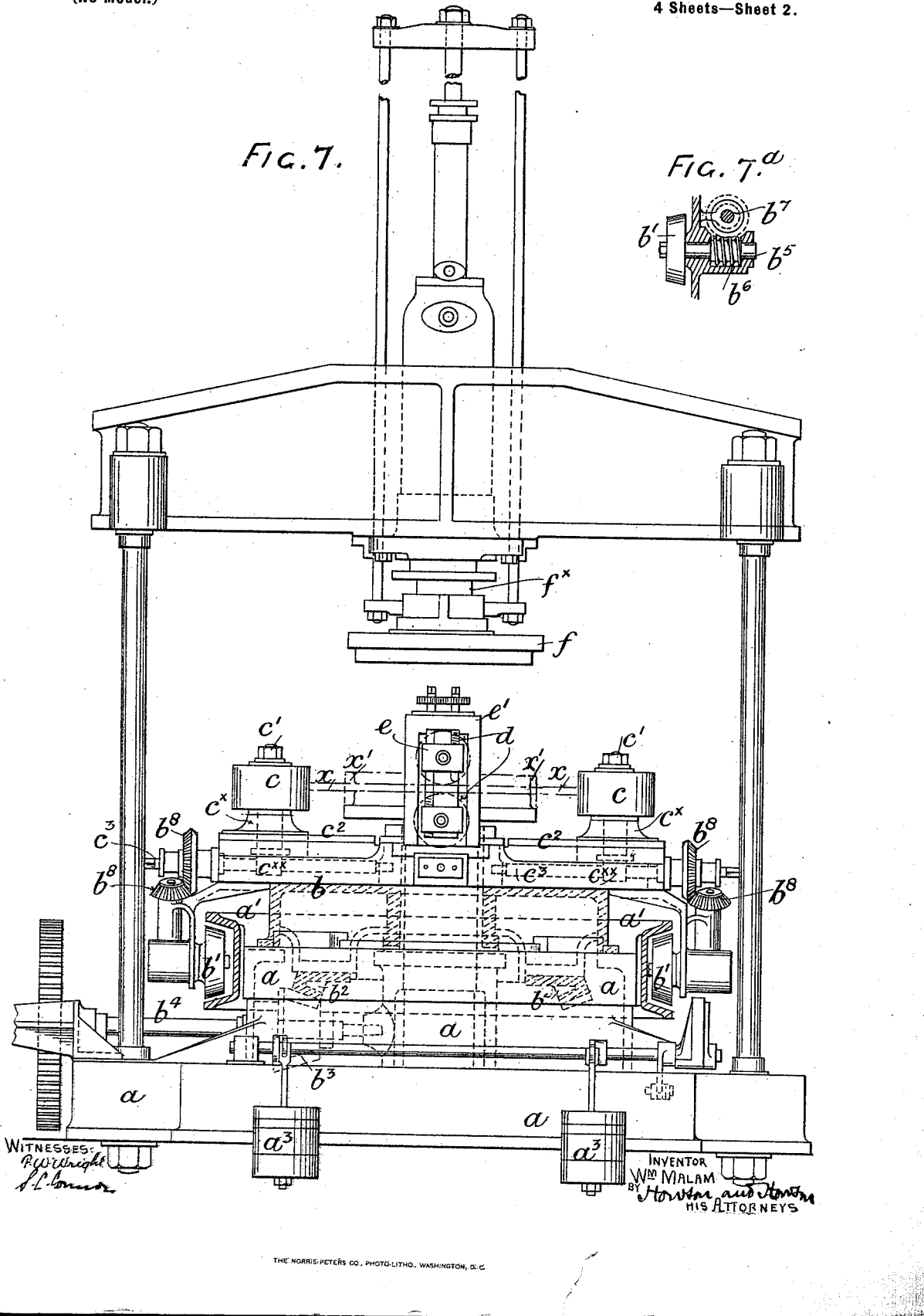

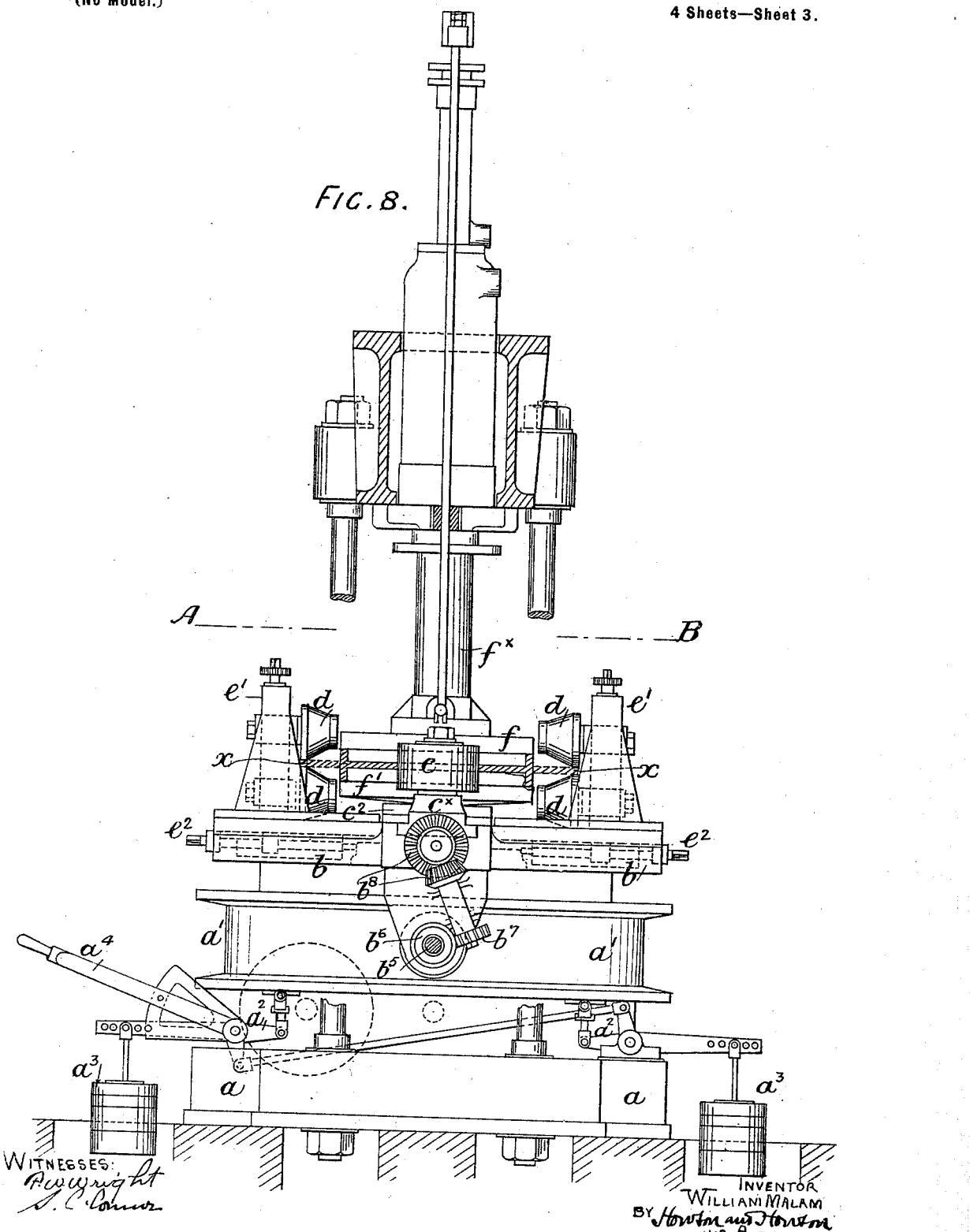

No. 619,197. Patented Feb. 7, 1899.
W. MALAM.
APPARATUS FOR MANUFACTURING WHEELS, PULLEYS, &c.
(Application filed Dec. 22, 1897.)
(No Model.) 4 Sheets—Sheet 4.
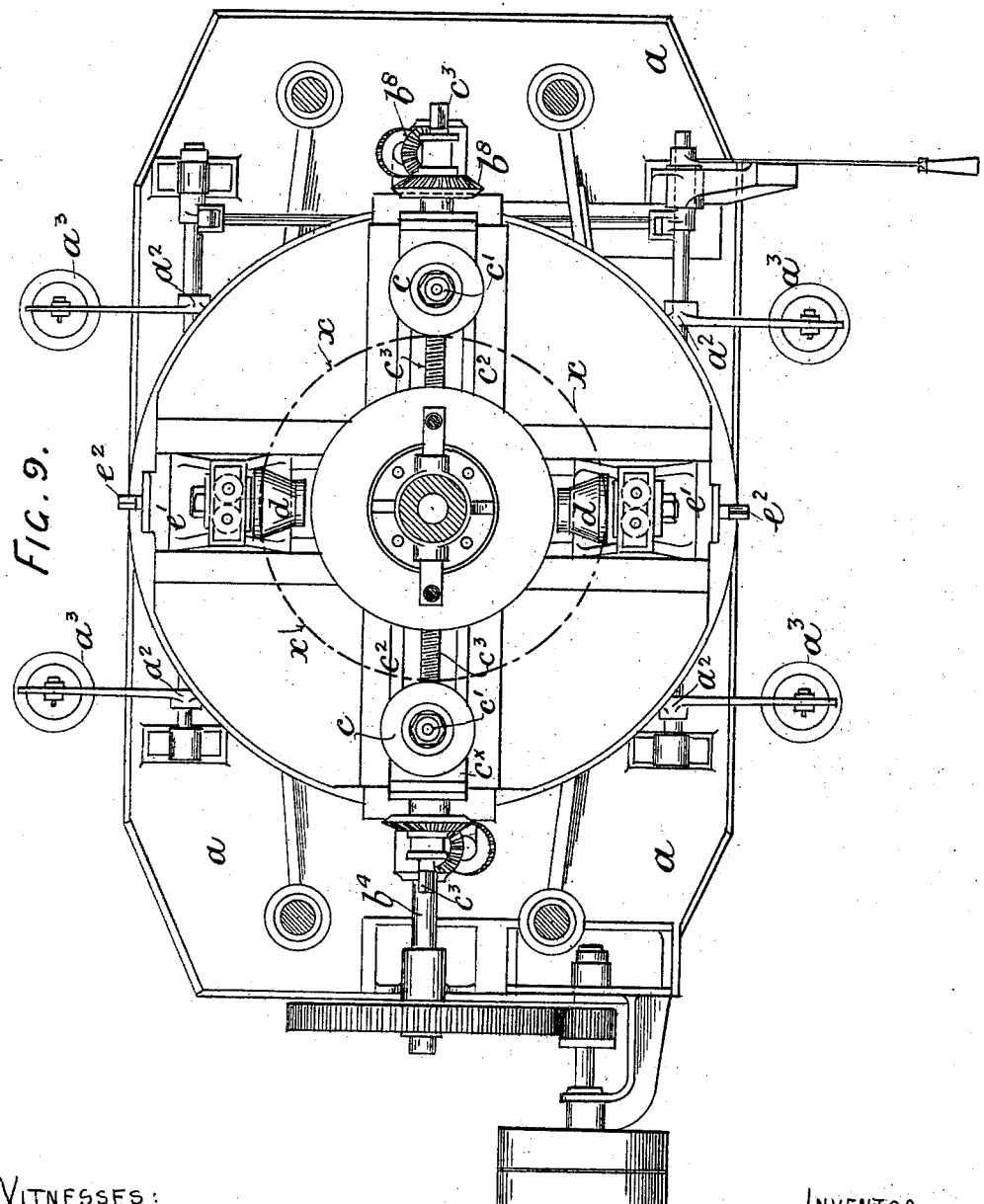
WITNESSES:
F. W. Wright.
S. C. Connor
INVENTOR
WILLIAM MALAM
BY
Howson and Howson
HIS ATTORNEYS.

UNITED STATES PATENT OFFICE.

WILLIAM MALAM, OF MANCHESTER, ENGLAND.

APPARATUS FOR MANUFACTURING WHEELS, PULLEYS, &c.

SPECIFICATION forming part of Letters Patent No. 619,197, dated February 7, 1899.

Application filed December 22, 1897. Serial No. 663,036. (No model.)

*To all whom it may concern:*

Be it known that I, WILLIAM MALAM, a subject of the Queen of Great Britain, residing at Fairfield, Manchester, in the county of Lancaster, England, have invented new and useful Improvements in the Manufacture of Wheels and Pulleys and Apparatus to be Employed for Such Manufacture, of which the following is a specification.

This invention relates to the manufacture of wheels and pulleys from steel or iron or other metal or similar material; and the invention consists in the following method of and apparatus for manufacturing the rim and the disk (or arms or spokes) of the pulley from a disk or plate, so as to form a weldless disk wheel or pulley.

My invention will be readily understood on reference to the drawings hereunto annexed and the following explanation thereof.

Figure 1:
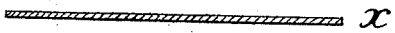
Figure 2:
Figure 3:
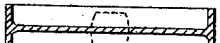
Figure 4:
Figure 5:
Figure 6:

Figures 1, 2, and 3 show a wheel in three stages of manufacture as aforesaid. Figs. 4, 5, and 6 show a modified manufacture hereinafter described. Figs. 7, 7$^a$, 8, and 9 illustrate mechanism for rolling the flange on the disk, Figs. 7 and 8 being elevations, partly in section, and Fig. 9 a plan in section at A B, Fig. 8.

The disk $x$ is held fixed, say, between two rams at its central part, and the flange or rim upset around the edge by rolling or otherwise. This operation is illustrated at Figs. 1, 2, and 3, showing the wheel completed in three stages.

I sometimes "sweat" or braze a boss or bosses onto the disk wheel or pulley, as shown dotted at Fig. 3; but in other cases I may in the first instance make a disk or bloom with a thickened center, as shown at Fig. 4, and then reduce the thickness and increase the diameter of the said disk, (see Fig. 5,) and then upset the flanges at the edge in the manner previously described.

My improved apparatus for the above process consists of means for clamping the disk $x$ firmly at the center between two circular dies, the outer edges of which are so shaped as to form a circumferential groove of the section required for part of the rim of the wheel which is completely formed by a roller or a series of rollers arranged around the said disk and caused to gradually approach the center thereof, so that as the disk is revolved or preferably as the rollers are carried around the edge of the disk they will upset the metal at the edge of the disk which is held straight by suitable guide-rollers, and thus the rim of the wheel is gradually formed thereon.

Upon a suitable fixed bed-plate or frame $a$ I mount an annular or circular frame $b$, carrying an upsetting-roller or a series of upsetting-rollers $c$ upon vertical spindles $c'$ and also another series of pairs of guide-rollers $d$, preferably conical, as shown, and so mounted that they can grip the edge of a metal disk (shown dotted at $x$) held concentric with the center of the annular or circular frame $b$ aforesaid between two circular clamping-plates $ff'$, the peripheries of which together form a circumferential die into which the edge of the said metal disk $x$ can be forced, as hereinafter described and as shown at Fig. 8. The plate $f$ is shown at Fig. 8 held down on the disk $x$ by the hydraulic ram $f^\times$; but other known means for clamping the plates $ff'$ and the disk $x$ together would be adopted if these parts are rotated and the frame $b$ is fixed.

The upsetting-rollers $c$ first named are mounted in blocks or brackets $c^\times$, capable of moving in slides $c^2$ nearer to or farther from the center, and the blocks or brackets $c^\times$ are provided with nuts $c^{\times\times}$, through which work adjusting-screws $c^3$, which are gradually rotated to move the said blocks or brackets $c^\times$ nearer to or farther from the center of the metal disk $x$, against the edge of which the said upsetting-rollers $c$ act, and owing to the rotary motion of the circular or annular frame $b$ (or the die-plates, if they revolve instead of the frame $b$) the said rollers $c$ as they approach the center will squeeze up or upset the edge of the metal disk $x$ until it is forced into the die formed by the edges of the plates $ff'$, which hold the central part of the disk $x$, the edge of which will then assume the form shown at $x'$, Fig. 7.

The guide-rollers $d$ above named are preferably conical and are arranged in suitable blocks or bearings $e$, one of each pair being above the outer edge of the disk and the other below the said disk in order to prevent the latter from bending while its edge is upset. Their blocks may be adjustable vertically—say by right and left handed screws or other suitable device—so that as the edge of the disk $x$ is thickened by the upsetting process they recede from each other, leaving a wider space between the rollers $d$ to correspond with the thickened edge of the disk $x$. I find it sufficient, however, to make the rollers $d$ conical, as shown, so that as the edge of the disk $x$ is thickened it approaches the center and finds more space between the coned rollers $d$, which only require adjustment at the commencement of the operation.

The bracket $e'$, which carries each pair of blocks $e$ and rollers $d$, can, if necessary, be moved away from the center of the die-plates $f f'$ to allow of the insertion of a fresh disk $x$ of metal (or when otherwise requisite) by means of a link and lever or by a screw $e^2$ and suitable handle or hand-wheel or other suitable device.

I prefer to make the circular or annular frame $b$ rotate, as shown, and I provide the adjusting-screws $c^3$ of the upsetting-rollers $c$ with suitable means, hereinafter described, for turning the said screws $c^3$ as the frame $b$ rotates. The frame $b$ may be rotated by the bevel-wheel $b^2$ and the pinion $b^3$ on the driving-shaft $b^4$.

The fixed bed-plate $a$ is provided with a circular track $a'$, around which the pulleys $b'$, carried by the frame $b$, travel, and the said pulleys $b'$ are thereby rotated. The pulleys $b'$ actuate their shafts $b^5$ (see detached horizontal section, Fig. 7$^a$) and worms or screws $b^6$ thereon, and the worms $b^6$ through the worm-wheels $b^7$ and bevel-gear $b^8$ thus actuate the screws $c^3$ as the frame rotates.

The track $a'$ is preferably carried on levers $a^2$ and counterbalanced by weights $a^3$, and when it is desired to actuate the screws $c^3$ the track is moved by the lever $a^4$ up or down, according to the direction in which the screws $c^3$ are to be rotated, so as to bring the upper or lower part of the track $a'$ in contact with the pulleys $b'$, and thus move the rollers $c$ inward or outward, as required, and the sliding motion of the upsetting roller or rollers can be arrested at any desired moment or moments without stopping the rotation of the frame $b$.

I claim as my invention—

1. Apparatus for the manufacture of wheels or pulleys, having two circular plates to clamp the disk of which the wheel is to be formed, and rollers adapted to upset the edge of the disk, with intermediate guide-rollers around said clamping-plates and having axes substantially at right angles to the axis of the disk and adapted to prevent the disk from bending while being upset, substantially as described.

2. Apparatus for the manufacture of wheels or pulleys, having two plates to clamp the disk of which the wheel is to be formed and rollers adapted to upset the edge of the disk with intermediate guide-rollers in pairs, the axes of which are substantially at right angles to the axis of the disk and adapted to hold between them the edge of the disk, substantially as described.

3. Apparatus for the manufacture of wheels or pulleys, having plates to clamp the disk of which the wheel is to be formed, and rollers adapted to upset the edge of the disk with intermediate conical guide-rollers in pairs, the axes of which are substantially at right angles to the axis of the disk and adapted to hold between them the edge of the disk, substantially as and for the purpose described.

4. Apparatus for the manufacture of wheels or pulleys, having rollers adapted to upset the edge of a disk, and adapted to travel around the periphery of said disk, in combination with means for moving said rollers toward or from the center of said disk without reversing the direction of motion of the other moving parts of the machine, substantially as described.

5. An apparatus for forming wheels by upsetting the edge of a disk, comprising a movable frame carrying upsetting-rollers, gearing connecting the same to a wheel, a flanged track, and means for causing said wheel to engage with either the top or bottom flange of said track, to cause the upsetting-rollers to move either toward or away from the disk, substantially as described.

6. Apparatus to be used in the manufacture of wheels and pulleys and the like consisting of the combination of two circular plates, clamping the disk of which the wheel is to be formed and rotated by suitable mechanism, the outer edges of the said plates being so shaped as to form together a circumferential groove of the section required for part of the rim of the wheel, with a roller or rollers bearing against the edge of the disk and being caused by suitable mechanism gradually to approach the center of the said disk as the latter revolves and to roll or upset the required flange, in combination with guide-rollers placed so as to hold the disk against bending while being upset, substantially as described.

In testimony whereof I have signed my name to this specification in the presence of two subscribing witnesses.

WILLIAM MALAM.

Witnesses:
GEORGE DAVIES,
CHARLES A. DAVIES.